(12) United States Patent
Weaver

(10) Patent No.: US 9,370,277 B2
(45) Date of Patent: Jun. 21, 2016

(54) CAMPFIRE COOKING UTENSIL AND ACCESSORY HOLDER ASSEMBLY

(71) Applicant: Nick Weaver, Zeeland, MI (US)

(72) Inventor: Nick Weaver, Zeeland, MI (US)

( * ) Notice: Subject to any disclaimer, the term of this patent is extended or adjusted under 35 U.S.C. 154(b) by 8 days.

(21) Appl. No.: 14/543,207

(22) Filed: Nov. 17, 2014

(65) Prior Publication Data
US 2016/0135644 A1    May 19, 2016

(51) Int. Cl.
*A47J 37/07* (2006.01)
*A47J 47/16* (2006.01)
*F16M 11/38* (2006.01)
*A47B 43/00* (2006.01)
*A47L 19/04* (2006.01)

(52) U.S. Cl.
CPC ............. *A47J 37/0786* (2013.01); *A47J 47/16* (2013.01); *F16M 11/38* (2013.01); *A47B 43/00* (2013.01); *A47L 19/04* (2013.01)

(58) Field of Classification Search
CPC ...... A47J 37/0786; A47J 47/16; A47B 43/00; A47L 19/04; F16M 11/38
USPC ............ 211/195, 41.2–41.6, 64, 65, 68, 70.5, 211/70.7, 70.8, 130.1, 132.1, 189, 190, 70; 108/147, 147.19–147.21, 53.5; 126/30, 126/9 B, 29, 50, 25 R, 9 R; 206/553, 541; 248/150, 166
See application file for complete search history.

(56) References Cited

U.S. PATENT DOCUMENTS

| 228,998 A * | 6/1880 | Johnston ................ A47F 5/02 211/70 |
| 303,783 A * | 8/1884 | Zimmerman ........ A47B 81/067 190/17 |
| 1,061,431 A | 5/1913 | West |
| 1,126,220 A * | 1/1915 | Jackson ................. F24B 1/205 126/29 |
| 1,779,788 A * | 10/1930 | Weston ..................... A47F 5/13 108/99 |
| 2,080,865 A * | 5/1937 | Lassiter ................ B60N 3/002 108/25 |
| 2,173,024 A | 9/1939 | Park |
| 2,517,448 A | 8/1950 | Schmeling |
| 2,522,223 A | 9/1950 | Hardin et al. |
| 2,576,750 A * | 11/1951 | Clark ..................... A47B 43/02 126/9 R |
| 2,579,655 A * | 12/1951 | Archibald .............. B65D 19/12 108/53.1 |
| 2,699,911 A * | 1/1955 | Chase .................. B65D 19/385 108/53.5 |

(Continued)

*Primary Examiner* — Joshua J Michener
*Assistant Examiner* — Devin Barnett
(74) *Attorney, Agent, or Firm* — King & Partners, PLC

(57) ABSTRACT

A portable campfire utensil and/or accessory holder assembly including a base member, a stop member, a first arm having an upper member and a lower member, a second arm having an upper member and a lower member, a top member; and wherein the campfire utensil and/or accessory holder assembly is convertible between a non-deployed storage configuration and a deployed utensil and/or accessory retaining configuration.

10 Claims, 8 Drawing Sheets

(56) References Cited

U.S. PATENT DOCUMENTS

| | | | | |
|---|---|---|---|---|
| 2,735,640 | A | * | 2/1956 | Banks ................ B44C 7/02 211/195 |
| 2,854,147 | A | * | 9/1958 | Derr ................ A01K 97/08 211/70.8 |
| 2,888,220 | A | | 5/1959 | Rose |
| 2,988,313 | A | * | 6/1961 | Ellison ................ B65D 19/385 108/53.5 |
| 2,994,500 | A | * | 8/1961 | Fraser ................ B65D 19/385 108/53.5 |
| 3,025,849 | A | | 3/1962 | Zimmerman |
| 3,159,116 | A | * | 12/1964 | Skubic ................ B65D 19/385 108/53.5 |
| 3,499,398 | A | * | 3/1970 | Murray ................ B65D 19/385 108/53.5 |
| 3,608,503 | A | * | 9/1971 | Marcheso ............ B65D 19/385 108/53.5 |
| 3,669,390 | A | | 6/1972 | Nielson |
| 3,804,033 | A | * | 4/1974 | Izawa ................ B65D 19/385 108/53.5 |
| 3,807,581 | A | * | 4/1974 | Nichols ................ B65D 88/129 108/53.5 |
| 3,837,328 | A | | 9/1974 | Schaffer |
| 3,850,295 | A | * | 11/1974 | Black ................ A47F 7/04 108/53.5 |
| 4,003,612 | A | * | 1/1977 | Munsell ................ A47F 7/0028 211/70.8 |
| 4,230,089 | A | | 10/1980 | Barden |
| 4,320,700 | A | | 3/1982 | Stachowicz |
| 4,517,885 | A | | 5/1985 | Thompson |
| 4,548,193 | A | | 10/1985 | Marogil |
| 4,673,088 | A | * | 6/1987 | Mancini ................ A63C 11/007 211/60.1 |
| 4,688,685 | A | | 8/1987 | Brace |
| 4,836,480 | A | | 6/1989 | Besner |
| 5,285,906 | A | * | 2/1994 | Wisnowski ........... A63C 11/028 211/62 |
| 5,557,877 | A | | 9/1996 | Colson |
| 5,657,883 | A | * | 8/1997 | Badia ................ A47B 81/005 211/60.1 |
| 5,785,046 | A | * | 7/1998 | Colla ................ F24B 1/202 126/151 |
| 5,848,584 | A | | 12/1998 | Brog |
| D419,018 | S | * | 1/2000 | Jeynes ................ D6/534 |
| 6,029,646 | A | | 2/2000 | Jackson |
| 6,202,569 | B1 | * | 3/2001 | Bailey ................ B65D 19/0026 108/53.1 |
| 6,505,746 | B1 | * | 1/2003 | Johnson ................ A47J 47/16 211/70.7 |
| 6,719,250 | B2 | | 4/2004 | FitzSimons |
| 6,945,395 | B2 | * | 9/2005 | Hsu ................ G11B 33/0455 206/308.1 |
| 7,080,811 | B2 | | 7/2006 | Thompson |
| 7,426,928 | B2 | * | 9/2008 | Sanders ................ A47J 33/00 108/1 |
| 7,946,434 | B1 | | 5/2011 | Greenspon ......... A47G 25/0685 211/195 |
| 8,215,497 | B1 | * | 7/2012 | Marchalonis .......... A47G 7/041 211/14 |
| 8,726,814 | B1 | * | 5/2014 | Matteo ................ A47B 9/16 108/116 |
| 8,800,788 | B1 | * | 8/2014 | Guidry ................ A01K 97/10 211/70.8 |
| 2002/0121493 | A1 | * | 9/2002 | Wang ................ A47F 7/19 211/195 |
| 2004/0103891 | A1 | * | 6/2004 | Martin ................ A47J 37/0763 126/25 AA |
| 2006/0102163 | A1 | * | 5/2006 | Sanders ................ A47J 33/00 126/30 |
| 2007/0235395 | A1 | * | 10/2007 | Mondale ................ A46B 17/00 211/65 |
| 2009/0025572 | A1 | | 1/2009 | Riesterer |
| 2012/0187118 | A1 | * | 7/2012 | Glenn ................ B65D 11/1853 220/6 |
| 2012/0204852 | A1 | * | 8/2012 | Boucher ................ F24C 1/16 126/30 |
| 2012/0234213 | A1 | * | 9/2012 | Kiolbasa ............ B65D 19/385 108/53.5 |
| 2013/0286323 | A1 | * | 10/2013 | Kuo ................ G02F 1/1333 349/58 |
| 2014/0209084 | A1 | * | 7/2014 | Cole ................ A47J 33/00 126/30 |
| 2015/0014265 | A1 | * | 1/2015 | Zhu ................ A47B 43/04 211/201 |
| 2015/0041420 | A1 | * | 2/2015 | Zelek ................ A47B 43/00 211/149 |
| 2015/0101585 | A1 | * | 4/2015 | Kreschmer ............ A47J 33/00 126/30 |
| 2015/0257530 | A1 | * | 9/2015 | Naka ................ A47B 47/0091 211/188 |
| 2015/0305497 | A1 | * | 10/2015 | Dolan ................ A47F 7/17 211/70.7 |

* cited by examiner

CAMPFIRE COOKING UTENSIL AND ACCESSORY HOLDER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to a campfire utensil and accessory holder assembly and, more particularly, to a portable campfire utensil (e.g., a fork, a pair of tongs, etcetera) and accessory (e.g., a round, square, or double square hobo pie iron, a waffle iron, a hotdog/bratwurst cooker, a hamburger griller, a s'more maker, etcetera) holder assembly that is preferably adapted to be readily converted between a compact, inoperative storage configuration and one or more operative deployed or use configurations, and vice versa. Among other things, the campfire utensil and accessory holder assembly: prevents damage to the utensils and accessories before and after use while near a campfire; prevents injury, including burns and puncture wounds, to those in close proximity to the campfire; and keeps the utensils and accessories generally clean and sand free in outdoor environments.

2. Background Art

Utensil holders, racks and stands have been known in the art for years, and are the subject of numerous patents, including, for example: U.S. Pat. No. 7,080,811 B2 entitled "Utensil Holder," U.S. Pat. No. 6,719,250 B2 entitled "Backpacker's Cooking Stand," U.S. Pat. No. 6,029,646 entitled "Adjustable Outdoor Cooking Rack," U.S. Pat. No. 4,836,480 entitled "Multi-purpose Support Frame For Cooking Grill," U.S. Pat. No. 4,688,685 entitled "Rack Assembly For Elongated Objects," U.S. Pat. No. 4,548,193 entitled "Multi-purpose Portable Outdoor Cooking Stand," U.S. Pat. No. 4,320,700 entitled "Barbeque Fork Holder," U.S. Pat. No. 1,061,431 entitled "Stand And Fork For Toasting," U.S. Pat. No. 228,998 entitled "Knife And Fork Holder," and United States Patent Application Publication Number 2009/0025572 A1 entitled "Apparatus For Holding Food Items For Roasting In A Fire," all of which are hereby incorporated herein by reference in their entirety—including all references cited therein.

U.S. Pat. No. 7,080,811 B2 appears to disclose a utensil holder that is designed for easy holding and removal of a utensil to be supported therein. The utensil holder in one embodiment is a continuous rod that includes a carriage having a first configured arrangement and a second configured arrangement. The configured arrangements form an inverted wedge and a U-shaped portion, respectively. In some embodiments, the inverted wedge defines an inverted V-shaped opening. The inverted V-shaped opening wedges the handle of a utensil and the U-shaped portion supports the utensil in a cantilevered position. In an alternate embodiment, an extended portion can hold a wider utensil while an inverted wedge in another plane can hold a utensil having a cylindrical handle. The utensil holder in some embodiments is designed to hold utensils for cooking food over campfires.

U.S. Pat. No. 6,719,250 B2 appears to disclose a backpacker's portable cooking stand that can be used for outdoor cooking and can be foldable to a compact configuration and includes a cooking platform for mounting over a source of heat, as well as foldable legs that are pivoted to over center attitudes for stable use of the cooking stand over a fire and are folded to a compact configuration for travelling.

U.S. Pat. No. 6,029,646 appears to disclose an outdoor cooking rack apparatus that comprises a grooved support post for support of cooking platforms, and a cooking platform for supporting a pot, grill or other device over a campfire. Additionally, the outdoor cooking rack apparatus may comprise a kettle hook attached to the apparatus for holding a kettle or other pot over a campfire. The cooking platforms contain a leveling bend in their attachment arm allowing them to hold pots and other utensils in a level position. Purported benefits of the cooking rack apparatus include: the ability to be vertically adjustable; the ability to receive a number of different cooking platforms; the ability to swing cooking platforms, within a horizontal plane, to the side or even rear of the apparatus; the ability to securely hold various cooking platforms in place; the ability to hold cooking platforms generally level and within a plane perpendicular to the support post; strength and durability; and setting up the apparatus requires no tools.

U.S. Pat. No. 4,836,480 appears to disclose a multi-purpose support frame for supporting a cooking grill in an elevated position. The support frame comprises a support base with a support rod secured to the base and extending vertically above an end of the base. A support arm is secured to the rod and extends above and over the support base. The support arm has spaced-apart attachment elements for engaging cooperating parts of the grill for retaining the grill substantially horizontally above the support base. The grill is adjustably positioned in height above the support base by an adjustment member secured to the support rod. A handle is associated with the grill.

U.S. Pat. No. 4,688,685 appears to disclose a rack assembly for skis and ski poles or other elongated objects. The assembly comprises a base portion, a central member upstanding from the base portion, and lower and upper sprocket members mounted on the central member, each of the sprocket members having a plurality of outwardly extending receiving portions, the upper and lower sprocket members being of the same outside diameter, the receiving portions of the upper sprocket being disposed, in plan, between the receiving portions of the lower sprocket, with the base portion underlying all of the receiving portions.

U.S. Pat. No. 4,548,193 appears to disclose a portable compactly stored outdoor cooking stand that can be used either with a self-contained charcoal compartment or over an open campfire, and can cook in many cooking modes including, open flame grilling, frying, steaming, boiling, and baking. A stand for straddling a campfire site vertically arranges one or more of three encompassed cooking utensils, namely a grill cooking surface, a pan for holding food or charcoal, and a vented cover for release of smoke, fumes, or steam. The pan and cover mate to form a portable suitcase-like carrying case with a handle that contains all the other elements for transport and compact storage when not in use.

U.S. Pat. No. 4,320,700 appears to disclose an apparatus for suspending one or more long-shafted forks in a vertical position for storage and in a horizontal operative position whereby the forks may be used to hold food over an open heat source. The apparatus comprises a base having dimensions sufficient to provide vertical stability, a stand post mounted vertically to the base, an upper bracket adapted to hold the forks vertically at the handles, and a lower bracket having a cradle and hook retaining means for retaining the forks horizontally in the second operative position. The lower bracket is also vertically movable along the stand post, and the hook and cradle retaining means are pivotable about a cross bracket portion of the lower bracket whereby the forks may be adjusted horizontally over the heat source.

U.S. Pat. No. 1,061,431 appears to disclose a stand for holding a toasting fork in any required position in front of a fire for toasting bread or other edibles thereon. The stand and fork are made of wire or other suitable material, and the stand has two uprights, and hooks on the front projecting upward, and those on the back reversed to counterbalance the article being toasted. The stand is either collapsible or rigid and can be fixed or not to a tin tray, with or without hooks on front to hang on fire bars. The fork includes a flat handle to fit snugly in hooks to prevent it turning around.

U.S. Pat. No. 228,998 appears to disclose a knife and fork holder that includes a base or foot of the holder, a body, and a top or handle, which is connected to the body by a screw arranged vertically in the top of the same. Disposed between the body and handle is a horizontally arranged plate or disk with T-shaped slots in its periphery for receiving and holding the forks. There are also a series of narrow elongated slots arranged radially around the top for receiving and holding knives.

United States Patent Application Publication Number 2009/0025572 A1 appears to disclose an appliance for holding food items, such as marshmallows and hot dogs, for roasting against the face of an open fire and includes food-carrying skewers that are rotatably mounted on an axis generally perpendicular to the elongated frame of the device. A drive linkage, manually operated from the opposite end of the frame, rotates the skewers such that the food products are uniformly exposed to the same heating, resulting in uniformly cooked food items without burning.

While utensil holders, racks and stands have been known in the art for years, there is a need for a portable campfire utensil and accessory holder assembly that is adapted to be readily converted between a compact, inoperative storage configuration and one or more operative deployed or use configurations.

These and other objects of the present invention will become apparent in light of the present specification, claims, and drawings.

SUMMARY OF THE INVENTION

In one embodiment, the present invention is directed to a portable campfire utensil and/or accessory holder assembly, consisting of, consisting essentially of, and/or comprising: (a) a base member; (b) a first arm; (c) a top member; and (d) wherein the campfire utensil and/or accessory holder assembly is convertible between a non-deployed storage configuration and a deployed utensil and/or accessory retaining configuration.

The present invention is also directed to a portable campfire utensil and/or accessory holder assembly, consisting of, consisting essentially of, and/or comprising: (a) a base member; (b) a stop member; (c) a first arm having an upper member and a lower member; (d) a second arm having an upper member and a lower member; (e) a top member; and (f) wherein the campfire utensil and/or accessory holder assembly is convertible between a non-deployed storage configuration and a deployed utensil and/or accessory retaining configuration.

In a preferred embodiment of the present invention, the stop member and the lower member of the first arm and/or the second arm are hingedly connected.

In another preferred embodiment of the present invention, the lower member of the first arm and the upper member of the first arm are hingedly connected, preferably via a releasably lockable hinge.

In yet another preferred embodiment of the present invention, the lower member of the second arm and the upper member of the second arm are hingedly connected, preferably via a releasably lockable hinge.

In a preferred embodiment of the present invention, the top member and the upper member of the first arm and/or second arm are hingedly connected.

In another aspect of the present invention, the stop member and the lower members of the first and second arms are hingedly connected, the lower members of the first and second arms and the upper members of the first and second arms are hingedly connected via a releasably lockable hinge, and the top member and the upper members of the first and second arms are hingedly connected.

In a preferred embodiment of the present invention, at least a portion of a top wall of the stop member is positioned below a top wall of the base member.

In another preferred embodiment of the present invention, a first portion of the top wall of the stop member is transverse to the top wall of the base member, and a second portion of the top wall of the stop member is orthogonal to the top wall of the base member.

In yet another preferred embodiment of the present invention, the base member comprises a ground-engaging front wall having an inner surface and an outer surface, a ground-engaging back wall having an inner surface and an outer surface, and a top wall having an inner surface and an outer surface. In this embodiment the top wall of the base member preferably comprises a plurality of slots adapted to receive a plurality of tabs of the stop member, and a plurality of apertures adapted to receive a portion of a utensil and/or accessory.

In a preferred embodiment of the present invention, the stop member preferably comprises a front wall having an inner surface and an outer surface, a back wall having an inner surface and an outer surface, and a top wall having an inner surface and an outer surface. In this embodiment, the inner surfaces of the front and back walls of the base member preferably contact the outer surfaces of the front and back walls of the stop member.

In another preferred embodiment of the present invention, at least a portion of the upper members of the first and second arms are positioned within at least a portion of the lower members of the first and second arms.

In yet another preferred embodiment of the present invention, the top member preferably comprises a plurality of substantially c-shaped apertures for retaining utensils and/or accessories therein.

In one embodiment, the present invention is also directed to a portable campfire utensil and/or accessory holder assembly, consisting of, consisting essentially of, and/or comprising: (a) a base member; (b) a stop member; (c) a first arm having an upper member and a lower member; (d) a second arm having an upper member and a lower member; (e) a top member; (f) wherein the campfire utensil and/or accessory holder assembly is convertible between a non-deployed storage configuration and a deployed utensil and/or accessory retaining configuration; (g) wherein the stop member and the lower member of the first arm are hingedly connected; (h) wherein the stop member and the lower member of the second arm are hingedly connected; (i) wherein the lower member of the first arm and the upper member of the first arm are hingedly connected via a releasably lockable hinge; (j) wherein the lower member of the second arm and the upper member of the second arm are hingedly connected via a releasably lockable hinge; (k) wherein the top member and the upper member of the first arm are hingedly connected; (l) wherein the top member and the upper member of the second arm are hingedly connected; (m) wherein at least a portion of a top wall of the stop member is positioned below a top wall of the base member; (n) wherein a first portion of the top wall of the stop member is transverse to the top wall of the base member, and wherein a second portion of the top wall of the stop member is orthogonal to the top wall of the base member; (o) wherein the base member comprises a ground-engaging front wall having an inner surface and an outer surface, a ground-engaging back wall having an inner surface and an outer surface, and the top wall having an inner surface and an outer surface; (p) wherein the top wall of the base member comprises a plurality of slots adapted to receive a plurality of tabs of the stop member; (q) wherein the top wall of the base member comprises a plurality of apertures adapted to receive a portion of a utensil and/or accessory; (r) wherein the stop member comprises a front wall having an inner surface and an outer surface, a back wall having an inner surface and an outer surface, and the top wall having an inner surface and an outer surface, wherein the inner surfaces of the front and back walls of the base member contact the outer surfaces of the front and back walls of the stop member; (s) wherein at least a portion of the upper members of the first and second arms are positioned within at least a portion of the lower members of the first and second arms; and (t) wherein the top member comprises a plurality of substantially c-shaped apertures for retaining utensils and/or accessories therein.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
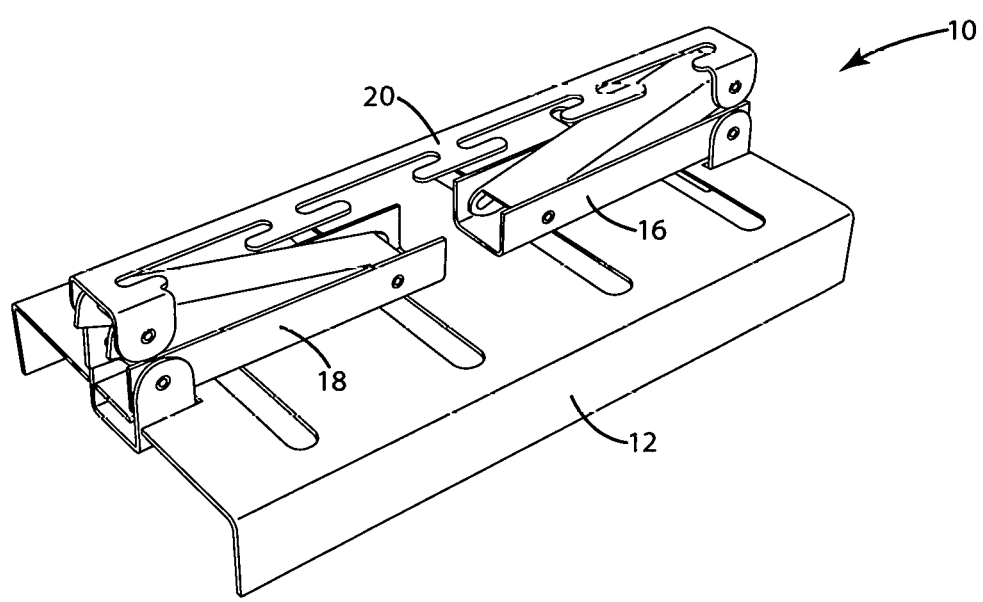
FIG. 1 is a front perspective view of a portable campfire utensil and/or accessory holder assembly, fabricated in accordance with the present invention, shown in a non-deployed storage configuration.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, are identified throughout the drawings by like reference characters. In addition, it will be understood that the drawings are merely schematic representations of one or more embodiments of the invention, and some of the components may have been distorted from their actual scale for purposes of pictorial clarity.

Figure 2:
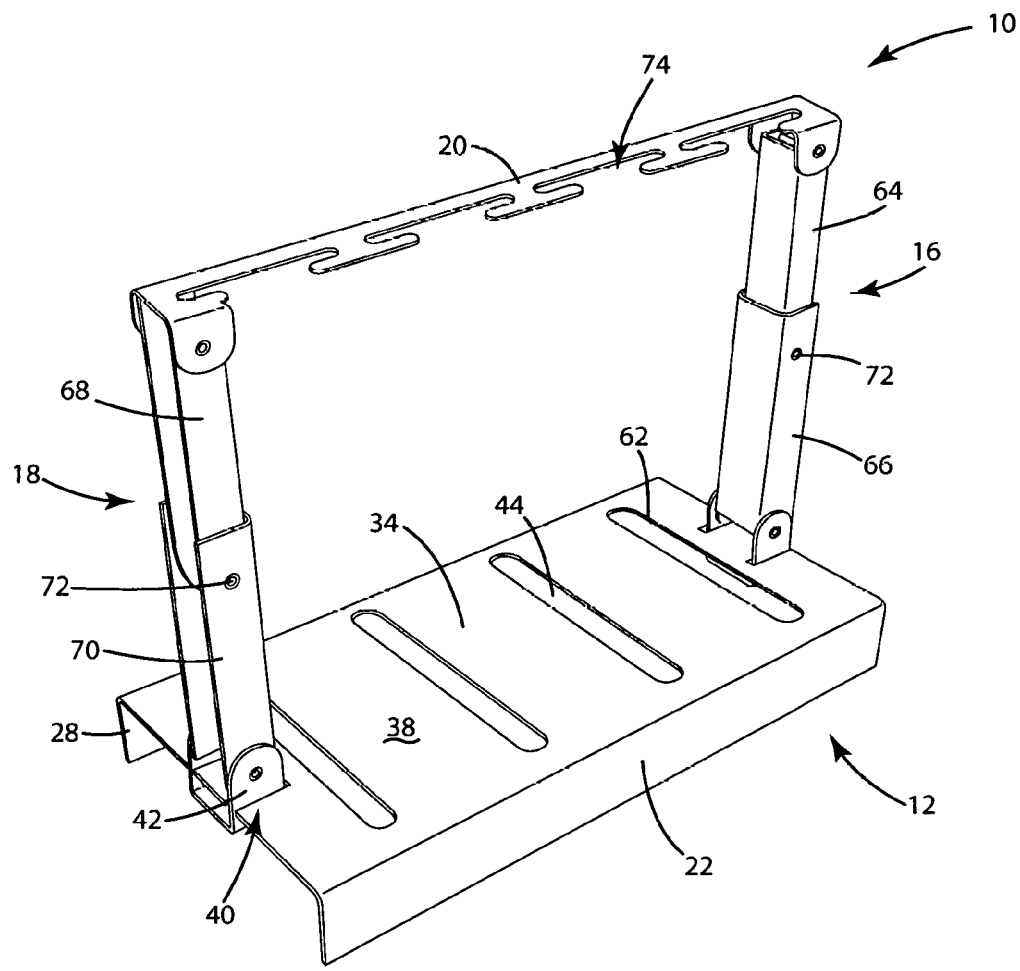
FIG. 2 is a front perspective view of a portable campfire utensil and/or accessory holder assembly, fabricated in accordance with the present invention, shown in a deployed utensil and/or accessory retaining configuration.
Figure 3:
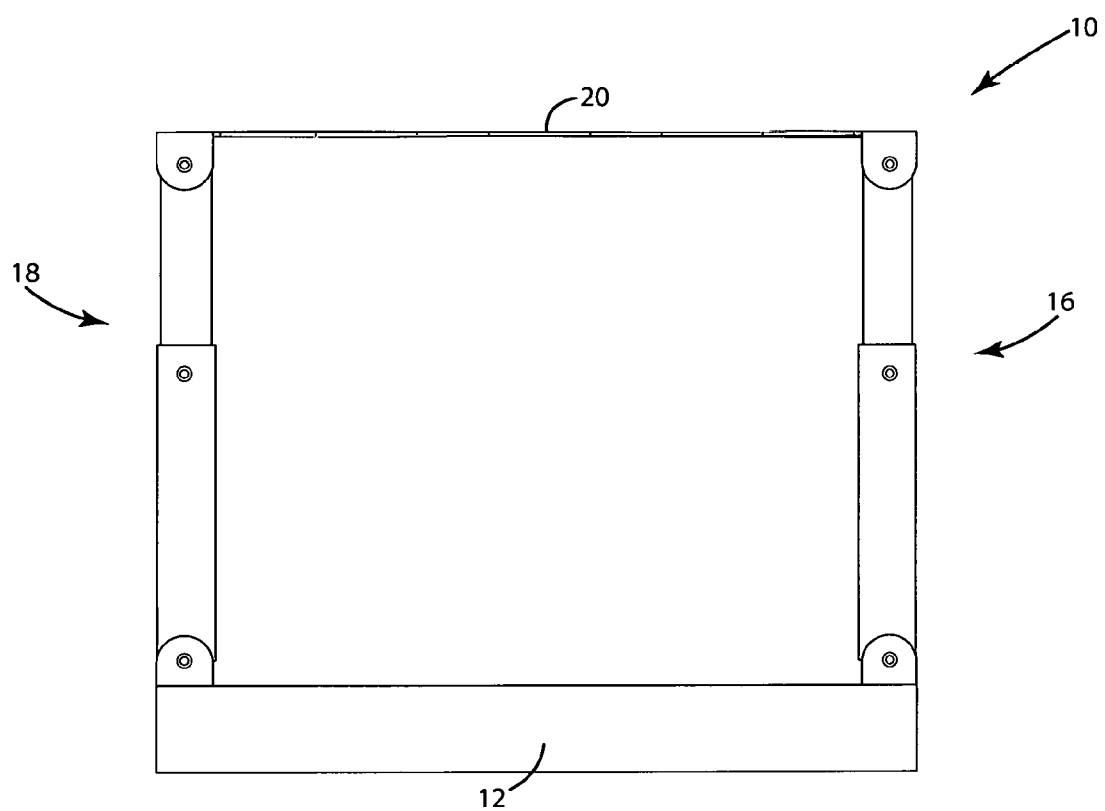
FIG. 3 is a front view of a portable campfire utensil and/or accessory holder assembly fabricated in accordance with the present invention.
Figure 4:
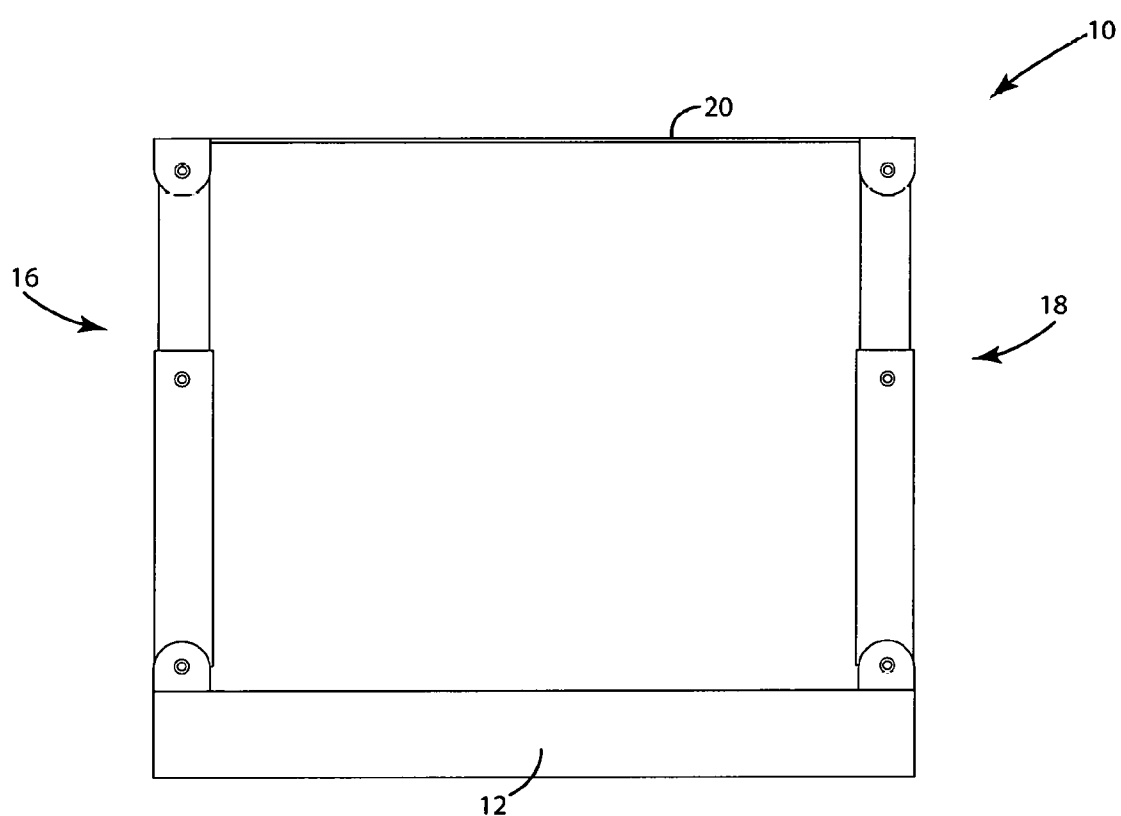
FIG. 4 is a rear view of a portable campfire utensil and/or accessory holder assembly fabricated in accordance with the present invention.

Referring now to the drawings, and to FIGS. 1 and 2 in particular, campfire utensil and/or accessory holder assembly 10 is shown which is adapted to be readily converted between a compact, storage or non-deployed configuration (FIG. 1) and a deployed or use configuration (FIG. 2) preferably by actuating a pair of lockably releasable hinges. In the non-deployed configuration, the campfire utensil and/or accessory holder assembly is remarkably compact and suitable for storage and transportation. In the deployed or use position, the campfire utensil and/or accessory holder assembly retains a plurality of utensils and/or accessories thereby, preventing damage to the utensils and accessories before and after use while near a campfire, as well as preventing injury, including burns and puncture wounds, to those in close proximity to the campfire. Moreover, the campfire utensil and/or accessory holder assembly keeps the utensils and accessories generally clean and sand free in outdoor, exposed, and/or dirty environments.

For purposes of the present disclosure, campfire utensil and/or accessory holder assembly 10 generally comprises base member, stop member 14, first arm 16, second arm 18, and top member 20.

In accordance with the present invention, campfire utensil and/or accessory holder assembly 10 and its component parts are preferably fabricated from metals (e.g., aluminum, copper, nickel), alloys of metal (e.g., stainless steel, bronze), natural and/or synthetic heat tolerant fiberglass, plastics and/or wood—just to name a few.

Figure 5:
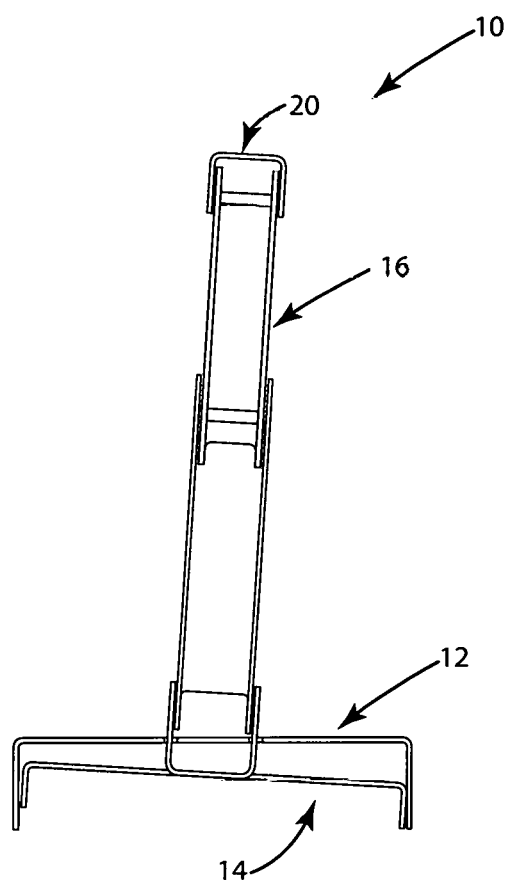
FIG. 5 is a left side view of a portable campfire utensil and/or accessory holder assembly fabricated in accordance with the present invention.
Figure 6:
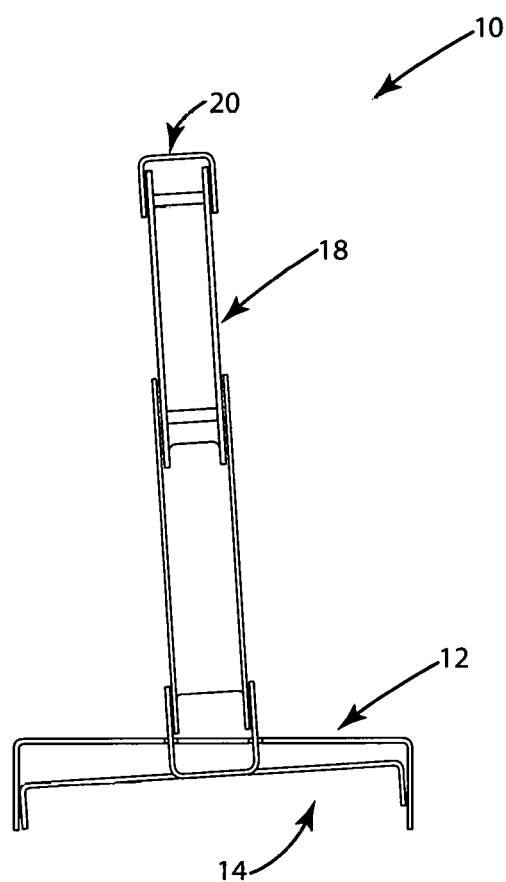
FIG. 6 is a right side view of a portable campfire utensil and/or accessory holder assembly fabricated in accordance with the present invention.
Figure 8:
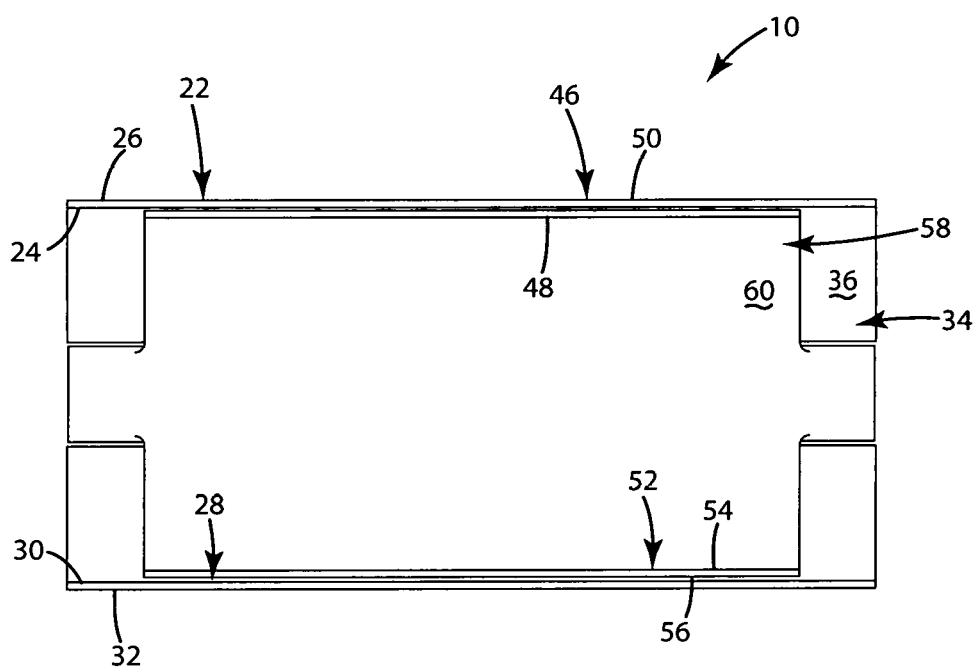
FIG. 8 is a bottom plan view of a portable campfire utensil and/or accessory holder assembly fabricated in accordance with the present invention.

As is best shown collectively in FIGS. 2, 5, and 8, base member 12 preferably includes ground-engaging front wall 22 having inner surface 24 and outer surface 26, ground-engaging back wall 28 having inner surface 30 and outer surface 32, and top wall 34 having inner surface 36 and outer surface 38. Base member 12 also preferably includes a plurality of slots 40, which receive tabs 42 associated with stop member 14, as well as a plurality of apertures 44 for retaining utensils and/or accessories therein (not shown).

As is best shown collectively in FIGS. 2, 5, and 8, stop member 14 preferably includes front wall 46 having inner surface 48 and outer surface 50, back wall 52 having inner surface 54 and outer surface 56, and top wall 58 having inner surface 60 and outer surface 62. It will be understood that outer surface 62 of top wall 58 of stop member 14 regulates the displacement and receipt of utensils and/or accessories within holder assembly 10. Additionally, top wall 58 is slanted from front to back in such a manner that utensils and/or accessories are retained within top member 20 in an inwardly biased manner.

In one embodiment of the present invention, inner surfaces 24 and 30 of front and back walls 22 and 28, respectively, of the base member 12 contact outer surfaces 50 and 56 of front and back walls 46 and 52, respectively, of stop member 14.

In accordance with one embodiment of the present invention, stop member 14 includes a plurality of tabs 42 which form a hinge with the lower members of first and second arms 16 and 18, respectively, via a rivet or pivot pin.

Referring once again to FIGS. 1 and 2, first arm 16 preferably includes upper member 64 and lower member 66, and second arm 18 preferably includes upper member 68 and lower member 70. The upper members 64 and 68 and lower members 66 and 70 of first and second arms 16 and 18, respectively, are connected via releasably lockable hinges 72. As is best shown in FIG. 1, first and second arms 16 and 18 are inwardly displaceable about hinges 72, which enable the outer surface of the arms to contact outer surface 38 of top wall 34 of base member 12. Notably, first and second arms 16 and 18 preferably comprise a triple hinge, which allows the arms to collapse into a substantially flat configuration onto base member 12. In this embodiment, at least a portion of the upper members of the first and second arms are positioned within at least a portion of the lower members of the first and second arms.

Figure 7:
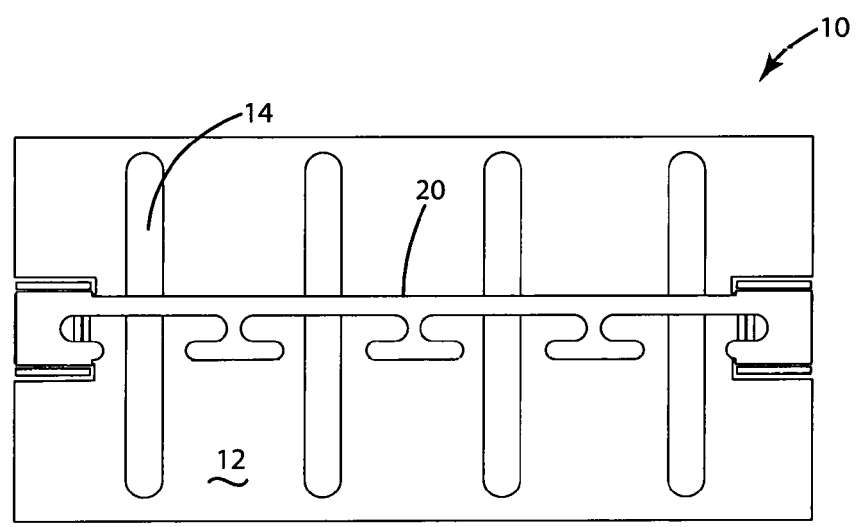
FIG. 7 is a top plan view of a portable campfire utensil and/or accessory holder assembly fabricated in accordance with the present invention.

As is best shown collectively in FIGS. 2 and 7, top member 20 preferably includes a plurality of tabs, which are for hingedly connected to the first and second arms, as well as a plurality of substantially c-shaped apertures 74 for releasably receiving utensils and/or accessories.

It will be understood that campfire utensil and/or accessory holder assembly 10 is assembled and operated using conventional techniques known to those having ordinary skill in art.

The foregoing description merely explains and illustrates the invention and the invention is not limited thereto except insofar as the appended claims are so limited, as those skilled in the art who have the disclosure before them will be able to make modifications without departing the scope of the invention.

What is claimed and desired to be secured by Letters Patent of the United States is:

1. A portable campfire utensil and accessory holder assembly, comprising:
   a base member;
   a stop member;
   a first arm having an upper member and a lower member;
   a second arm having an upper member and a lower member;
   a top member;
   wherein the campfire utensil and accessory holder assembly is convertible between a non-deployed storage configuration and a deployed utensil and accessory retaining configuration;
   wherein the stop member and the lower member of the first arm are hingedly connected;
   wherein the stop member and the lower member of the second arm are hingedly connected;
   wherein the lower member of the first arm and the upper member of the first arm are hingedly connected via a releasably lockable hinge;
   wherein the lower member of the second arm and the upper member of the second arm are hingedly connected via a releasably lockable hinge;
   wherein the top member and the upper member of the first arm are hingedly connected;
   wherein the top member and the upper member of the second arm are hingedly connected;
   wherein at least a portion of a top wall of the stop member is positioned below a top wall of the base member;
   wherein a first portion of the top wall of the stop member is transverse to the top wall of the base member, and wherein a second portion of the top wall of the stop member is orthogonal to the top wall of the base member;
   wherein the base member comprises a ground-engaging front wall having an inner surface and an outer surface, a ground-engaging back wall having an inner surface and an outer surface, and the top wall having an inner surface and an outer surface;
   wherein the top wall of the base member comprises a plurality of slots adapted to receive a plurality of tabs of the stop member;
   wherein the top wall of the base member comprises a plurality of apertures adapted to receive a portion of a utensil and accessory;
   wherein the stop member comprises a front wall having an inner surface and an outer surface, a back wall having an inner surface and an outer surface, and the top wall having an inner surface and an outer surface, wherein the inner surfaces of the front and back walls of the base member contact the outer surfaces of the front and back walls of the stop member;
   wherein at least a portion of the upper members of the first and second arms are positioned within at least a portion of the lower members of the first and second arms; and
   wherein the top member comprises a plurality of substantially c-shaped apertures for retaining utensils and accessories therein.

2. A portable campfire utensil and accessory holder assembly, comprising:
   a base member configured to rest upon a generally horizontal support surface;
   a stop member;
   a first arm having an upper member and a lower member;
   a second arm having an upper member and a lower member;
   a top member extending between the first and second arms, wherein the first and second arms support the top member at an elevated position above the base member and the generally horizontal support surface;
   wherein the stop member and the lower members of the first and second arms are each hingedly connected;
   wherein the lower member of the first arm and the upper member of the first arm are hingedly connected via a releasably lockable hinge;
   wherein the lower member of the second arm and the upper member of the second arm are hingedly connected;
   wherein the upper members of the first and second arms are each hingedly connected to the top member;
   wherein the to member comprises a plurality of generally c-shaped apertures for retaining utensils and accessories therein;
   wherein the campfire utensil and accessory holder assembly is convertible between a non-deployed storage configuration wherein each pair of upper and lower members each fold downwardly in opposite directions so that the corresponding upper members each rests upon the corresponding lower members while the top member, the upper members, the lower member, and the stop member are pivotally connected to each other and the upper members and lower members are each generally parallel to the base member and a deployed utensil and accessory-retaining configuration wherein the upper and lower members of the first and second arms are each generally perpendicular relative to the base member and utensils can extend between the top member and the base member.

3. The campfire utensil and accessory holder assembly according to claim 1, wherein the lower member of the second arm and the upper member of the second arm are hingedly connected via a releasably lockable hinge.

4. The campfire utensil and accessory holder assembly according to claim 1,
wherein at least a portion of a top wall of the stop member is positioned below a top wall of the base member.

5. The campfire utensil and accessory holder assembly according to claim 4, wherein a first portion of the top wall of the stop member is transverse to the top wall of the base member, and wherein a second portion of the top wall of the stop member is orthogonal to the top wall of the base member.

6. The campfire utensil and accessory holder assembly according to claim 1, wherein the base member comprises a ground-engaging front wall having an inner surface and an outer surface, a ground-engaging back wall having an inner surface and an outer surface, and a top wall having an inner surface and an outer surface.

7. The campfire utensil and accessory holder assembly according to claim 6, wherein the top wall of the base member comprises a plurality of slots adapted to receive a plurality of tabs of the stop member.

8. The campfire utensil and accessory holder assembly according to claim 6, wherein the top wall of the base member comprises a plurality of apertures adapted to receive a portion of a utensil and accessory.

9. The campfire utensil and accessory holder assembly according to claim 6, wherein the stop member comprises a front wall having an inner surface and an outer surface, a back wall having an inner surface and an outer surface, and a top wall having an inner surface and an outer surface, and wherein the inner surfaces of the front and back walls of the base member contact the outer surfaces of the front and back walls of the stop member.

10. The campfire utensil and accessory holder assembly according to claim 1, wherein at least a portion of the upper members of the first and second arms are positioned within at least a portion of the lower members of the first and second arms.

* * * * *